United States Patent
Kawagoe et al.

(10) Patent No.: US 12,032,738 B2
(45) Date of Patent: Jul. 9, 2024

(54) DISPLAY CONTROL DEVICE, DISPLAY CONTROL METHOD, AND RECORDING MEDIUM

(71) Applicant: PANASONIC INTELLECTUAL PROPERTY MANAGEMENT CO., LTD., Osaka (JP)

(72) Inventors: Mutsumi Kawagoe, Osaka (JP); Nobutaka Kitajima, Osaka (JP); Kenji Oga, Osaka (JP); Masakazu Nakazawa, Osaka (JP); Naoki Ikemoto, Osaka (JP); Junya Yusa, Kanagawa (JP); Kazuki Kuzu, Tokyo (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

(21) Appl. No.: 18/084,122

(22) Filed: Dec. 19, 2022

(65) Prior Publication Data

US 2023/0205314 A1   Jun. 29, 2023

(30) Foreign Application Priority Data

Dec. 23, 2021 (JP) .................................. 2021-210005
Dec. 7, 2022 (JP) .................................. 2022-195855

(51) Int. Cl.
 *G06F 3/01* (2006.01)
 *B60K 35/00* (2006.01)
 (Continued)

(52) U.S. Cl.
 CPC .............. *G06F 3/013* (2013.01); *B60K 35/00* (2013.01); *G06F 3/1423* (2013.01); *B60K 35/10* (2024.01);
 (Continued)

(58) Field of Classification Search
 CPC ....... G06F 3/013; G06F 3/1423; B60K 35/00; B60K 2370/149; B60K 2370/152;
 (Continued)

(56) References Cited

U.S. PATENT DOCUMENTS

| 10,810,966 B1* | 10/2020 | Landgraf ............... H04N 7/188 |
| 2010/0207750 A1* | 8/2010 | Fujisawa ................. G10L 13/00 |
| | | 340/438 |
| 2017/0004641 A1 | 1/2017 | Ota et al. |

FOREIGN PATENT DOCUMENTS

| JP | 4687521 | 5/2011 |
| JP | 2019-111948 | 7/2019 |
| WO | 2015/159340 | 10/2015 |

OTHER PUBLICATIONS

Office Action from Japan Patent Office (JPO) in Japanese Patent Appl. No. 2022-195855, dated Oct. 17, 2023, together with an English language translation.

* cited by examiner

*Primary Examiner* — Christopher E Leiby
(74) *Attorney, Agent, or Firm* — Greenblum & Bernstein, P.L.C.

(57) ABSTRACT

A display control device includes: at least one display, among a plurality of displays, that displays a message; storage that stores a first table for displaying the message; and a processing unit that determines, when information about a vehicle is generated and a display is present in an eye-gaze direction of the user that an eye-gaze detector detects, whether to cause the display to display the message, based on the first table and the eye-gaze direction detected, the display being one of the plurality of displays.

20 Claims, 7 Drawing Sheets

(51) Int. Cl.
  *G06F 3/14*  (2006.01)
  *B60K 35/10*  (2024.01)
  *B60K 35/22*  (2024.01)
(52) U.S. Cl.
  CPC ........ *B60K 35/22* (2024.01); *B60K 2360/149* (2024.01); *B60K 2360/21* (2024.01)
(58) Field of Classification Search
  CPC .......... B60K 2370/21; B60K 2370/182; G09G 2340/14; G09G 2340/0464; G09G 2354/00; G09G 2380/10
  See application file for complete search history.

| Large category | Middle category | Small category | Time-related category | Risk-related category | Vehicle optimization-related category | Individually optimized matter-related category | Action-related category | Display position-related category | Information display density-related category |
|---|---|---|---|---|---|---|---|---|---|
| Safety | | Collision reduction brake warning | O | O | O | O | O | O | O |
| | | False start prevention and control warning | O | O | O | O | O | O | O |
| | | Inter-vehicle distance warning | △ | O | O | O | O | O | O |
| | | Lane departure warning | O | O | O | O | O | O | O |
| | | Rearward visibility information | O | O | O | O | O | O | O |
| | | Overspeed information | O | O | O | O | O | O | O |
| | | Sudden control (sudden steering, hard braking, abrupt acceleration) | △ | x | x | x | x | x | x |
| Car navigation system | Guidance | Route guidance (indication of right/left-turn, right/left-turn-only lane, one-way street, etc.) | x | x | O | O | O | O | x |
| | | Congestion information | x | x | O | O | x | x | x |
| | | Congestion avoidance information | △ | O | O | x | x | x | x |
| | Hazard | Accident-prone point | △ | O | O | x | x | x | x |
| | | Sharp corner information | x | O | x | x | O | x | x |
| Notification to terminal device | Communication | Phone call receiving | x | x | x | x | O | x | x |
| | | SNS notification (e-mail, etc.) | x | x | x | x | O | x | x |
| | | App notification (notice information) | △ | O | x | x | O | x | x |
| | Hazard | Disaster alert (earthquake, heavy rain, etc.) | O | O | x | x | O | x | x |
| Vehicle | Warning light | Brake warning light | O | O | x | x | O | x | x |
| | | Oil pressure warning light | O | O | x | x | O | x | x |
| | | Battery warning light | O | O | x | x | O | x | x |
| | | Engine warning | O | O | x | x | O | x | x |
| | | Water temperature warning | O | O | x | x | O | x | x |
| | | Tire pressure warning (when exceeding proper range) | O | O | x | x | O | x | x |
| | Service | Seatbelt reminder | O | x | x | x | O | x | x |
| | | Vehicle door lock reminder | O | x | x | x | O | x | x |
| | | Security warning (theft prevention) | O | x | x | x | O | x | x |
| | | Remaining fuel amount (when smaller than threshold) | O | x | x | x | O | x | x |
| | Problem | Timing of engine oil change | x | x | x | x | x | x | x |
| | | Timing of vehicle inspection | x | x | x | x | x | x | x |
| | | Sensor problem | x | x | x | x | O | x | x |
| | | Countermeasure (prompt to go to service center) | x | x | x | x | O | x | x |
| Vehicle interior | User/passenger | Passenger status | x | x | O | O | x | x | x |
| | Object | Baggage status | x | x | O | O | x | x | x |
| | | Information about location where smartphone is lost | x | x | O | x | x | x | x |
| V2X | Infrastructure | Signal and intersection information | x | x | O | x | x | x | x |
| | Other vehicles | Dangerous driving | x | x | O | x | x | x | x |
| | | Approaching of emergency vehicle | x | x | O | x | x | x | x |
| | | Bus operation information | x | x | O | x | x | x | x |
| | | ORBIS information | x | x | O | x | x | x | x |
| | | Nearby vehicle detection information | x | x | O | x | x | x | x |

FIG. 3B

| Types of information about vehicle | Display flag |
|---|---|
| Lane departure warning | ON |
| Overspeed warning | ON |
| Battery warning | ON |
| Congestion information | OFF |
| Phone call receiving | OFF |
| SNS notification | OFF |

FIG. 3C

| Types of information about vehicle | Display flag |
|---|---|
| Lane departure warning | 5 |
| Overspeed warning | 4 |
| Battery warning | 3 |
| Congestion information | 2 |
| Phone call receiving | 1 |
| SNS notification | 1 |

FIG. 6

| Vehicle running state | Running straight | Turning right/left<br>Running around curve/intersection | Stopped | Parked |
|---|---|---|---|---|
|  | A | B | C | D |

FIG. 7

Vehicle running state

| Road condition | | Running straight | Turning right/left<br>Running around curve/intersection | Stopped | Parked |
|---|---|---|---|---|---|
| | General road (one-way single lane) | | | | |
| | General road (a plurality of lanes) | | | | |
| | Expressway (one-way single lane) | | | | |
| | Expressway (a plurality of lanes) | | | | |

# DISPLAY CONTROL DEVICE, DISPLAY CONTROL METHOD, AND RECORDING MEDIUM

CROSS REFERENCE TO RELATED APPLICATION

The present application is based on and claims priority of Japanese Patent Application No. 2021-210005 filed on Dec. 23, 2021 and Japanese Patent Application No. 2022-195855 filed on Dec. 7, 2022.

FIELD

The present disclosure relates to a display control device, a display control method, and a recording medium.

BACKGROUND

The conventional in-vehicle display devices include a display device that displays a message to a driver. When focusing on the screen of the display device to read a message displayed thereon, the driver may not be able to pay attention to the surroundings while reading the message, which is dangerous. Also, when a message to be displayed is short so that it can be read quickly by the driver, the driver may not correctly understand the details of such message.

To enable the notification of a message to the driver, Patent Literature (PTL) 1 discloses a display device that includes: a visual line detection part that detects the direction of the visual line of a user; and a selection part that selects, on the basis of the detection result of visual line direction, a display part looked at by the user from a plurality of display parts as the display part for displaying a message.

CITATION LIST

Patent Literature

PTL 1: Japanese Patent No. 4687521

SUMMARY

However, the display device according to PTL 1 can be improved upon.

The display control device and the display control method of the present discourse are capable of improving upon the above related art.

In view of the above, the display control device according to an aspect of the present disclosure is a display control device that causes at least one of a plurality of displays to display a message. This display control device includes: storage that stores a first table for displaying the message; and a processing unit that determines, when information about a vehicle is generated and a display is present in an eye-gaze direction of the user that an eye-gaze detector detects, whether to cause the display to display the message, based on the first table and the eye-gaze direction detected, the display being one of the plurality of displays.

Note that these general and specific aspects may be implemented using a system, a device, a method, a recording medium, or a computer program, or any combination of systems, devices, methods, recording media, and computer programs.

A display control device and so forth according to an aspect of the present disclosure are capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

Hereinafter, certain exemplary embodiments are described in greater detail with reference to the accompanying Drawings.

Each of the exemplary embodiments described below shows a general or specific example. The numerical values, shapes, elements, the arrangement and connection of the elements, steps, the processing order of the steps etc. shown in the following exemplary embodiments are mere examples, and therefore do not limit the scope of the present disclosure. Therefore, among the elements in the following exemplary embodiments, those not recited in any one of the independent claims are described as optional elements.

Also note that the drawings are schematic diagrams, and thus they are not always exactly illustrated. For example, the drawings are not necessarily illustrated to the same scale. Also, the same reference marks are assigned to the elements that are substantially the same throughout the drawings, and overlapping description may be omitted or simplified.

Embodiment 1

<Configuration and Function: Display Device 10>

Figure 1:
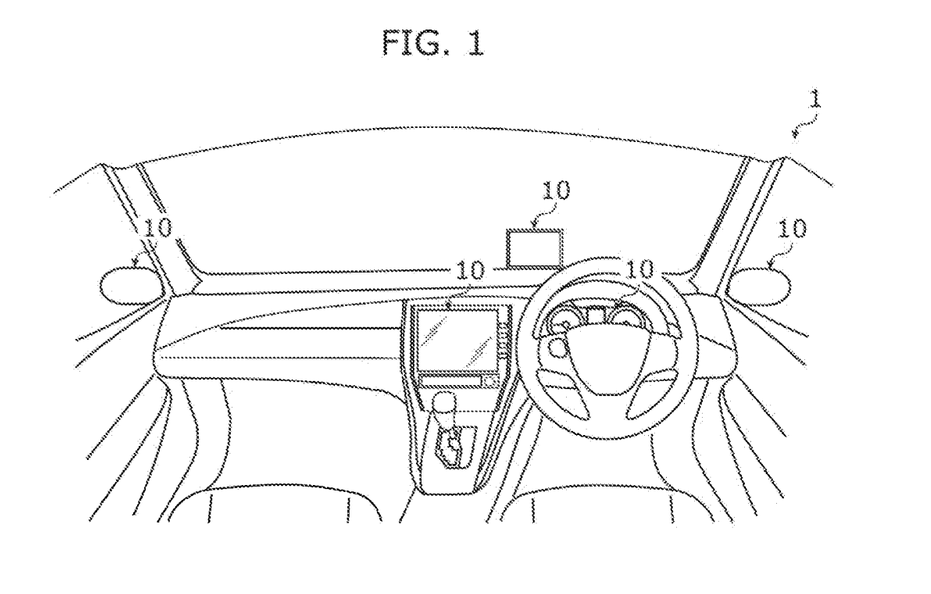
FIG. 1 is a diagram showing a display device according to Embodiment 1 mounted in a vehicle.
Figure 2:
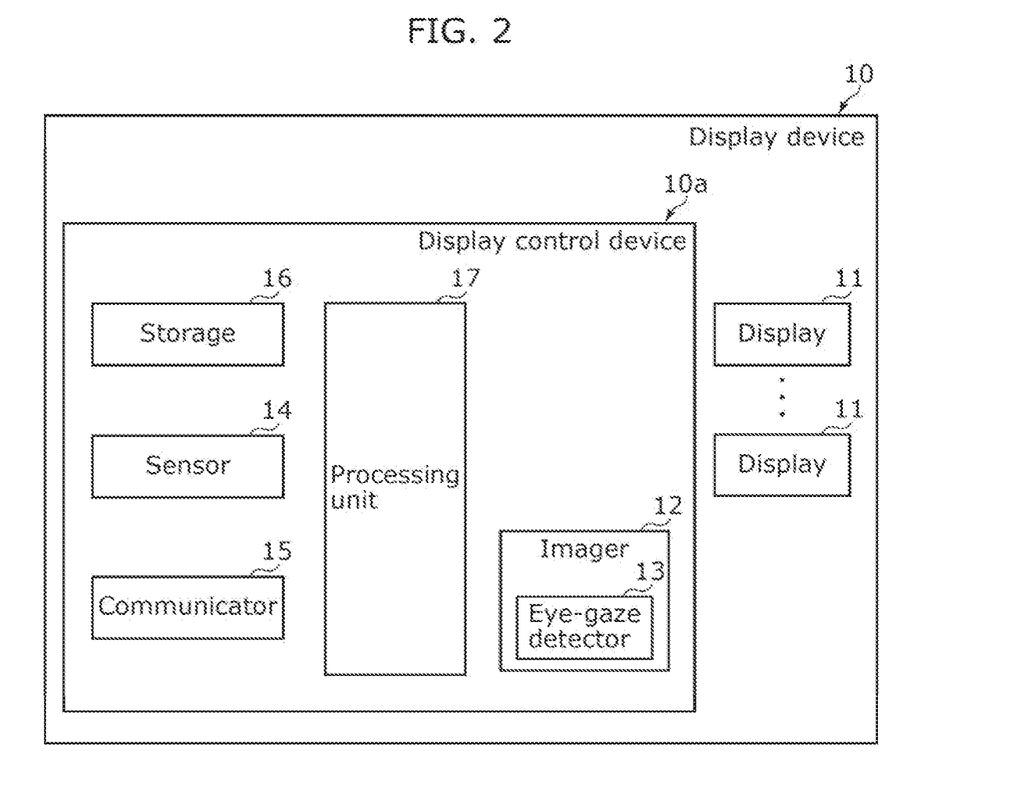
FIG. 2 is a block diagram showing the display device that includes a display control device according to Embodiment 1.

FIG. 1 is a diagram showing display device 10 according to Embodiment 1 mounted in vehicle 1. FIG. 1 shows an example of the vehicle interior of vehicle 1. FIG. 2 is a block diagram showing display device 10 that includes display control device 10a according to Embodiment 1.

As shown in FIG. 1 and FIG. 2, display device 10 is mounted in vehicle 1. A plurality of displays 11 are mounted in vehicle 1. When a user focuses his/her eyes on information displayed on display 11, display device 10 appropriately displays a message. The user here is a driver.

More specifically, display device 10 includes display control device 10a and a plurality of displays 11. Note that there may be a single display 11.

[Display 11]

Each of displays 11 is an in-vehicle display mounted in vehicle 1, such as a center display, a head up display (HUD), a meter display, and a passenger display. When vehicle 1 is reversing, each of displays 11 also serves as a back monitor by displaying an image captured by imager 12.

Each of displays 11 is also capable of displaying a message that corresponds to information about vehicle 1. Here, example items of the information about vehicle 1 include information about the safety of vehicle 1, guidance information and hazard information of the car navigation system, communication and hazard information notified to a terminal device, information about warning light of vehicle 1, information about service and problem, information about user/passenger and object inside of the vehicle, and information about infrastructure and other vehicles (V2X: vehicle to everything) interconnected to vehicle 1.

Examples of the information about the safety of vehicle 1 include collision reduction brake warning, false start prevention and control warning, inter-vehicle distance warning, lane departure warning, rearward visibility information, overspeed information, and sudden control (sudden steering, hard braking, and abrupt acceleration).

Examples of the guidance information of the car navigation system include route guidance (indication of right/left-turn, right/left-turn-only lane, one-way street, etc.), congestion information, and congestion avoidance guidance. Examples of the hazard information of the car navigation system include information about accident-prone point and sharp corner.

Examples of the communication notified to the terminal device include phone call receiving, SNS notification (e-mail, etc.), and app notification (notice information). Examples of the hazard information notified to the terminal device include disaster alert (earthquake, heavy rain, etc.).

Examples of the information about warning light of vehicle 1 include brake warning light, oil pressure warning light, battery warning light, engine warning, water temperature warning, tire pressure (when exceeding the proper range), seatbelt reminder, vehicle door lock reminder, security warning (theft prevention), and the remaining fuel amount (when smaller than the threshold).

Examples of the information about service of vehicle 1 include the timing of engine oil change and the timing of vehicle inspection.

Examples of the information about problem of vehicle 1 include sensor problem and countermeasure (prompt to go to a service center).

Examples of the information about user/passenger inside of the vehicle include passenger status.

Examples of the information about object inside of the vehicle include information about the location where a smartphone has been lost and baggage status.

Examples of the information about infrastructure (V2X) interconnected to vehicle 1 include signal and intersection information.

Examples of the information about other vehicles (V2X) interconnected to vehicle 1 include information about dangerous driving, approaching of an emergency vehicle, and bus operation information.

Other examples of the information about V2X interconnected to vehicle 1 include ORBIS information and nearby vehicle detection information.

Note that displays 11 are not limited to displaying the foregoing items of information. Stated differently, each of displays 11 is capable of displaying, for example, surroundings information, navigation information, music information, multimedia information, disaster information, measurement device information, traffic information, and so forth.

[Display Control Device 10a]

Display control device 10a is capable of controlling a message, an image, and so forth to be displayed on each of displays 11 of display device 10 mounted in the vehicle. Display control device 10a includes imager 12, sensor 14, communicator 15, storage 16, and processing unit 17. Note that the present embodiment shows an example in which display control device 10a includes imager 12, but display control device 10a may not include imager 12. Stated differently, imager 12 and display control device 10a may be separately configured.

[Imager 12]

Imager 12 is, for example, an in-vehicle camera mounted in vehicle 1. Imager 12 is capable of capturing an image of the user. Imager 12 is also capable of capturing an image of the surroundings of vehicle 1 and the vehicle interior of vehicle 1. Imager 12 captures an image of the user, analyzes the captured image, and outputs the result of the analysis to processing unit 17.

More specifically, imager 12 includes eye-gaze detector 13.

Eye-gaze detector 13 analyzes the image captured by imager 12 to detect the eye-gaze direction of the user. More specifically, eye-gaze detector 13 extracts the eyeballs of the user from the image of the user captured by imager 12 to identify the eye gaze of the user from, for example, the movement of the extracted eyeballs. Also, eye-gaze detector 13 outputs, to processing unit 17, eye-gaze information that is the result of the detection obtained by identifying the eye gaze of the user. Here, the eye-gaze information is information representing the eye gaze of the user.

[Sensor 14]

Sensor 14 is an in-vehicle sensor mounted in vehicle 1. Sensor 14 may be capable of obtaining the information about the safety of vehicle 1, the information about warning light of vehicle 1, the information about service and problem the information about user/passenger and object inside of the vehicle, and so forth, and outputting the obtained information to processing unit 17. Note that sensor 14 may not be an element included in display control device 10a.

[Communicator 15]

Communicator 15 is a communication interface mounted in vehicle 1. Communicator 15 enables vehicle 1 to communicate with an external terminal. Communicator 15 may also be capable of obtaining the guidance information and hazard information of the car navigation system, the communication and hazard information notified to the terminal device, the information about infrastructure and other vehicles (V2X) interconnected to vehicle 1, and so forth, and outputting the obtained information to processing unit 17. Note that communicator 15 may not be an element included in display control device 10a.

[Storage 16]

Storage 16 stores a first table for displaying a message. Storage 16 may also store a plurality of first tables that correspond to different states of vehicle 1, such as that vehicle 1 is running straight, turning right/left, running on a familiar/unfamiliar road, and so forth.

The first table includes a plurality of categories.

Figure 3A:
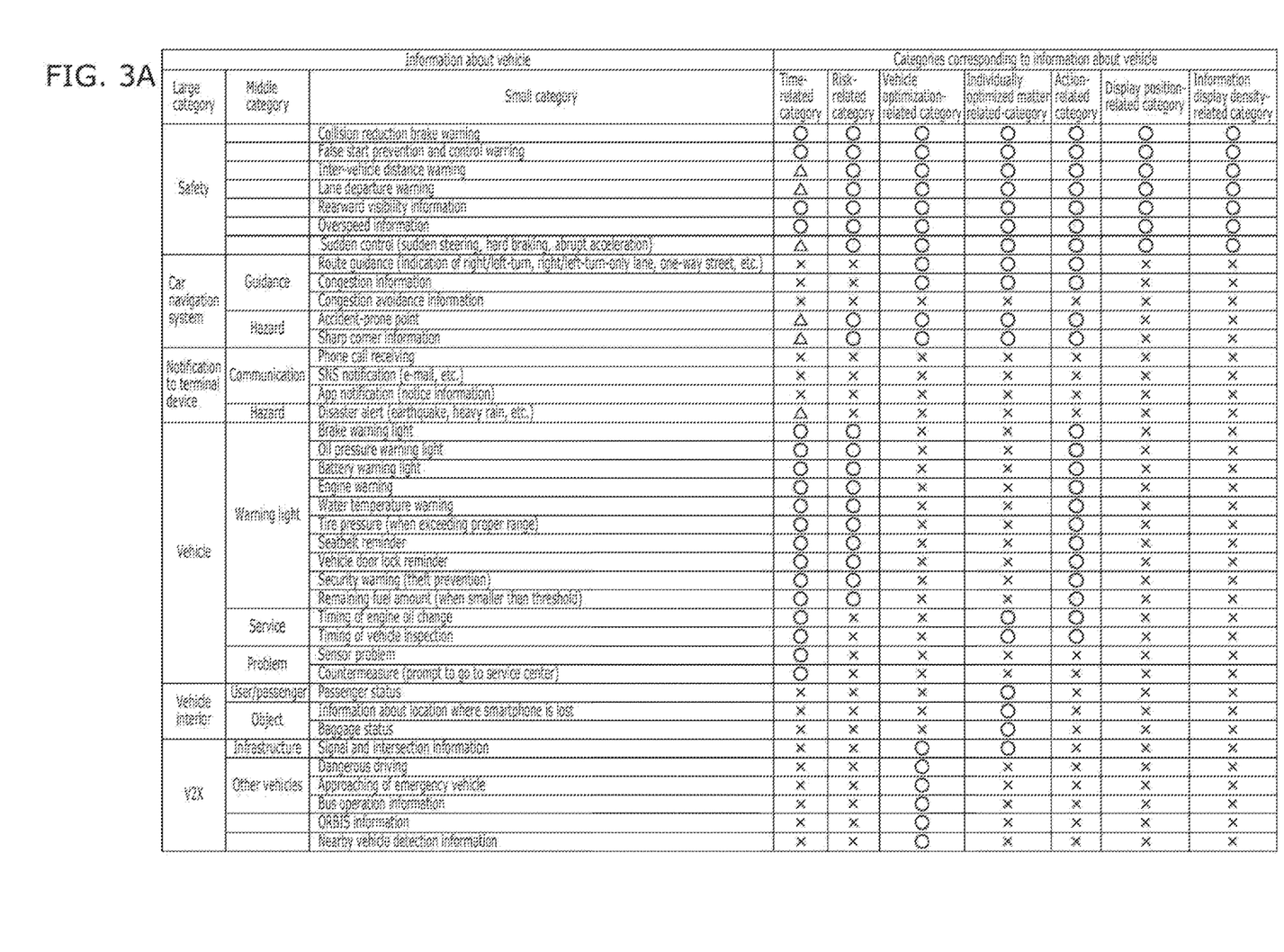
FIG. 3A is a diagram showing a plurality of categories and information about the vehicle in a first table.

FIG. 3A is a diagram showing a plurality of categories and the information about vehicle 1 in the first table.

As shown in FIG. 3A, the plurality of categories correspond to the information about the safety of vehicle 1, the guidance information and hazard information of the car navigation system, the communication and hazard information notified to the terminal device, the information about warning light of vehicle 1, the information about service and problem, the information about user/passenger and object inside of the vehicle, and the information about infrastructure and other vehicles (V2X) interconnected to vehicle 1. Stated differently, the first table is a table that shows the relation between the plurality of categories and the items of information about vehicle 1.

The first table includes a category relating to time (hereinafter also referred to as "time-related category") that indicates the remaining time available for the user to address a matter indicated by information about vehicle 1. For example, the time-related category categorizes the information about the safety of vehicle 1, the hazard information of the car navigation system, the hazard information notified to the terminal device, the information about warning light of vehicle 1, the information about service for vehicle 1, and the information about problem of vehicle 1. Stated differently, the time-related category is set to display a message for information that indicates a matter with a high degree of urgency.

The first table also includes a category relating to a risk (hereinafter also referred to as "risk-related category") that is a human risk, a physical risk, or a temporal risk that can occur unless a matter indicated by information about vehicle 1 is addressed. For example, the risk-related category categorizes the information about the safety of vehicle 1, the hazard information of the car navigation system, and the information about warning light of vehicle 1. Stated differently, the risk-related category is set to display a message for a matter that causes a significant human, physical, or temporal risk.

The first table also includes a category relating to optimization of vehicle 1 to a driving situation (hereinafter also referred to as "vehicle optimization-related category") that indicates adaptation of vehicle 1 to the driving situation in a matter indicated by information about vehicle 1. For example, the vehicle optimization-related category categorizes the information about the safety of vehicle 1, the guidance information of the car navigation system, the hazard information of the car navigation system, and the information about infrastructure and other vehicles (V2X) interconnected to vehicle 1. Stated differently, the vehicle optimization-related category is set to display a message for a matter that relates to the running of vehicle 1 and poses a danger.

The first table also includes a category relating to optimization for an individual (hereinafter also referred to as "individually optimized matter-related category") that indicates adaptation to the user in a matter indicated by information about vehicle 1. For example, the individually optimized matter-related category categorizes the information about the safety of vehicle 1, the guidance information of the car navigation system, the hazard information of the car navigation system, the information about service of vehicle 1, the information about user/passenger and object inside of the vehicle, and the information about infrastructure and other vehicles (V2X) interconnected to vehicle 1. The individually optimized matter-related category is set to display a message about a lost property and a maintenance service for vehicle 1. In addition to above, the individually optimized matter-related category may also be set to display a message in accordance with the driving skills of the user, whether the user is driving on a familiar/unfamiliar road, the physique of the user, and so forth.

The first table also includes a category relating to action (hereinafter also referred to as "action-related category") that indicates the necessity for a passenger to address a matter indicated by information about vehicle 1. For example, the action-related category categorizes the information about the safety of vehicle 1, the guidance information of the car navigation system, the hazard information of the car navigation system, the information about warning light of vehicle 1, and the information about service for vehicle 1. Stated differently, the action-related category is set to display a message for the case where a damage can occur unless the user takes some sort of action.

The first table also includes a category relating to display position (hereinafter also referred to as "display position-related category") for determining whether a message can be newly displayed together with the originally displayed information. For example, the display position-related category categorizes the information about the safety of vehicle 1. Stated differently, the display position-related category is set to display a message relating to a person, an animal, or the like that is present around vehicle 1 and that needs to be extracted and displayed on display 11 in an enhanced manner.

The first table also includes a category relating to the density of information display (hereinafter also referred to as "information display density-related category") for determining whether to display a message on display 11 with the lowest resolution among displays 11 and on the smallest one of displays 11. For example, the information display density-related category categorizes information about the safety of vehicle 1. Stated differently, since displays 11 with low resolution and small screen cannot display much information, the information display density-related category is set to display a message for information about the safety of vehicle 1.

Storage 16 includes, for example, a primary storage device such as a random access memory (RAM) and a read only memory (ROM). Storage 16 may also include a secondary storage device such as a hard disk drive (HDD) and a solid state drive (SSD) and a third-order storage device such as an optical disc and an SD card.

[Processing Unit 17]

As shown in FIG. 2, processing unit 17 determines whether the eye gaze of the user represented by the eye-gaze information overlaps any one of displays 11. Stated differently, processing unit 17 identifies display 11, among the plurality of displays 11, that is present in the eye-gaze direction of the user.

More specifically, processing unit 17 reads, from storage 16, information indicating the position of each of displays 11 in the vehicle interior, the size, the shape, etc. of each of displays 11 to determine whether the gaze point of the user is on any one of displays 11. Stated differently, processing unit 17 compares the information indicating the position of each of displays 11 in the vehicle interior, the size of display 11, the shape of display 11, etc. with the position coordinates representing the position of the eye gaze of the user or the gaze point of the user. With this, it is possible for processing unit 17 to determine whether the eye gaze of the user overlaps any one of displays 11.

Here, the gaze point is the point gazed at by the user which is a specific point, located in the eye-gaze direction from the user, on which the eye gaze of the user is focused.

Note that the gaze point can be identified by eye-gaze detector 13 on the basis of the eye gaze of the user.

When information about vehicle 1 is generated and any one of displays 11 is present in the eye-gaze direction of the user, processing unit 17 determines whether to display a message on such display 11, on the basis of the first table and the eye-gaze direction detected by eye-gaze detector 13. Here, display 11 that is present in the eye-gaze direction of the user is not only display 11 that is present in the direction of the point gazed at by the user, but also another display 11 that is present therearound.

For example, when processing unit 17 determines to display a message on the basis of the first table, processing unit 17 causes display 11 that is present in the eye-gaze direction of the user to display a message.

Figure 3B:
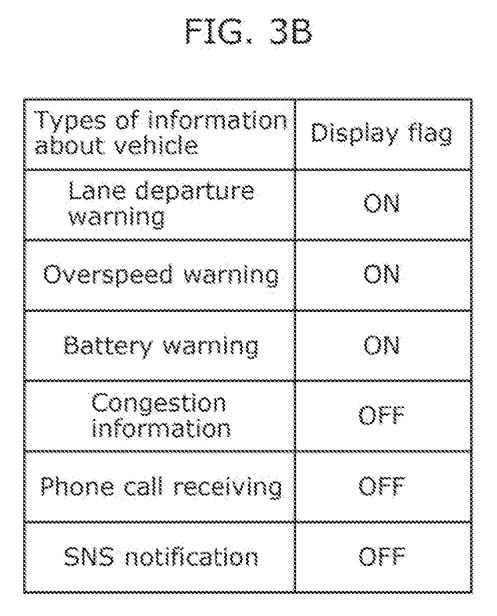
FIG. 3B is a diagram showing the relation between the types of information about the vehicle and display flags.

Here, an example of the first table is shown in FIG. 3B. FIG. 3B is a diagram showing the relation between the types of information about vehicle 1 and display flags.

As shown in FIG. 3B, when using the first table that shows the relation between the types of information about vehicle 1 and the display flags, for example, processing unit 17 generates a message and causes display 11 that is present in the eye-gaze direction of the user to display the generated message for the lane departure warning, the overspeed warning, and the battery warning because the display flags thereof are ON. Stated differently, display 11 displays a message in addition to the originally displayed information.

Meanwhile, when processing unit 17 determines not to display a message on the basis of the first table, processing unit 17 does not cause display 11 that is present in the eye-gaze direction of the user to newly display a message. When using the first table that shows the relation between the types information and the display flags, for example, processing unit 17 does not cause display 11 that is present in the eye-gaze direction of the user to newly display a message for the congestion information, the phone call receiving, and the SNS notification because the display flags thereof are OFF. Stated differently, display 11 displays only the originally displayed information.

When processing unit 17 determines not to display a message, processing unit 17 may cause another display 11 that is different from display 11 that is present in the eye-gaze direction of the user to display a message. When there is a phone call, for example, processing unit 17 may cause such other display 11 to display a message indicating that a phone call has been received.

Figure 3C:
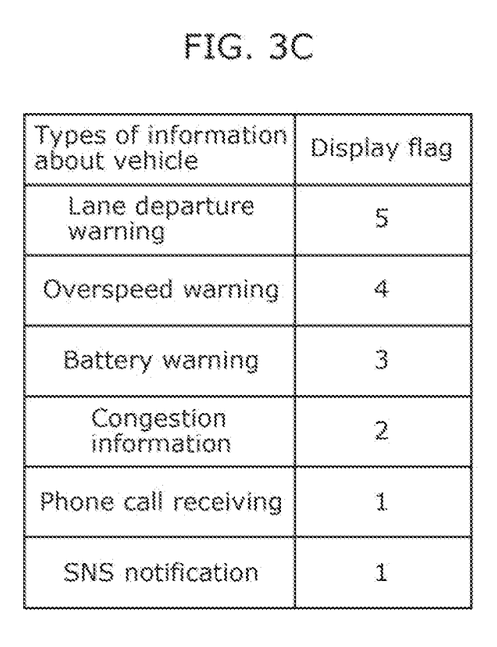
FIG. 3C is a diagram showing the relation between the types of information about the vehicle and display flags.

Note that FIG. 3B shows the display flags that indicate only ON and OFF, but the display flags may indicate, for example, numerical values as shown in FIG. 3C. FIG. 3C is a diagram showing the relation between the types of information about vehicle 1 and display flags. In this case, when the items of information about vehicle 1 are set at five levels, for example, processing unit 17 may set to ON a display flag of information that is set at the level of 3 or higher and cause display 11 to display a message, where the level of 3 or higher is used as a threshold. Note that the uppermost value and the threshold may be changed as appropriate.

Processing unit 17 may also use different first tables depending on the running state of vehicle 1, such as that vehicle 1 is running straight, turning right/left, running on a familiar/unfamiliar road, and so forth.

When a plurality of categories are selected and processing unit 17 determines to display a message on the basis of at least one of the selected categories, processing unit 17 causes display 11 that is present in the eye-gaze direction of the user to display the message. The user can freely select a category.

When a plurality of categories are selected and the display flags of all of these selected categories are ON, for example, processing unit 17 may cause display 11 to display a message. Also, when a plurality of categories are selected and the display flag of simply any one of these selected categories is ON, processing unit 17 may also cause display 11 to display a message.

To be more specific, when the time-related category and the individually optimized matter-related category are selected as the plurality of categories, for example, processing unit 17 may set to ON the display flag of the accident-prone point, which is one item of the information about vehicle 1, for a user not accustomed to driving so that a message is to be displayed, while setting the display flag to OFF for a user accustomed to driving so that a message is not to be displayed.

As described above, it is possible to categorize the items of information about vehicle 1 and display only an appropriate message on display 11 that is present in the eye-gaze direction of the user, on the basis of the first table. Also, a message is to be displayed for information about vehicle 1 that indicates a matter with a high degree of urgency, thereby ensuring the safety of vehicle 1. Meanwhile, no message is to be displayed for information about vehicle 1 that indicates a matter with a low degree of urgency. This saves the trouble of the user having to check a message.

<Processing Operations>

The following describes processing operations performed by display control device 10a, the display control method, and the recording medium in the present embodiment.

[Example Operations]

Figure 4:
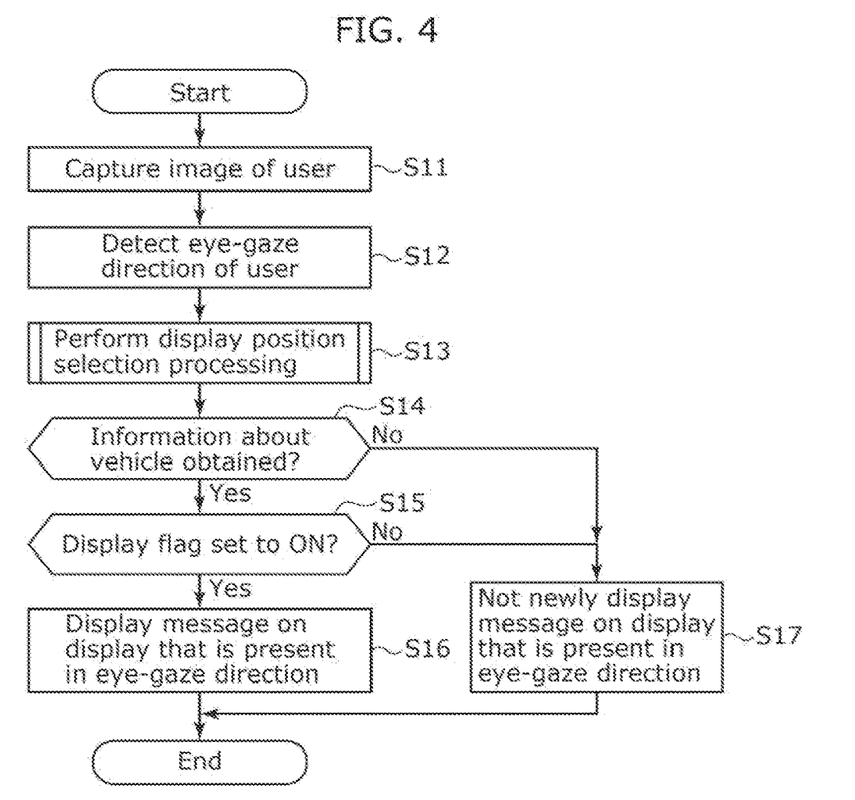
FIG. 4 is a flowchart of processing operations performed by the display device according to Embodiment 1.

FIG. 4 is a flowchart of processing operations performed by display device 10 according to Embodiment 1.

As shown in FIG. 4, imager 12 captures an image of the user (S11).

Next, eye-gaze detector 13 analyzes the image captured by imager 12 to detect the eye-gaze direction of the user (S12). Eye-gaze detector 13 identifies the eye gaze of the user and outputs, to processing unit 17, eye-gaze information that is the result of the detection. Here, the eye-gaze information is information representing the eye gaze of the user.

Subsequently, processing unit 17 identifies displays 11 that are present in the eye-gaze direction of the user indicated by the eye-gaze information.

Processing unit 17 then identifies display 11, among the plurality of displays 11, that is present in the eye-gaze direction of the user, on the basis of the eye gaze of the user indicated by the eye-gaze information (S13). This process is repeatedly performed.

Processing unit 17 then determines whether information about vehicle 1 has been obtained (S14).

When processing unit 17 determines that no information about vehicle 1 has been obtained (No in S14), processing unit 17 does not cause display 11 that is present in the eye-gaze direction of the user indicated by the eye-gaze information to newly display a message (S17).

Figure 5:
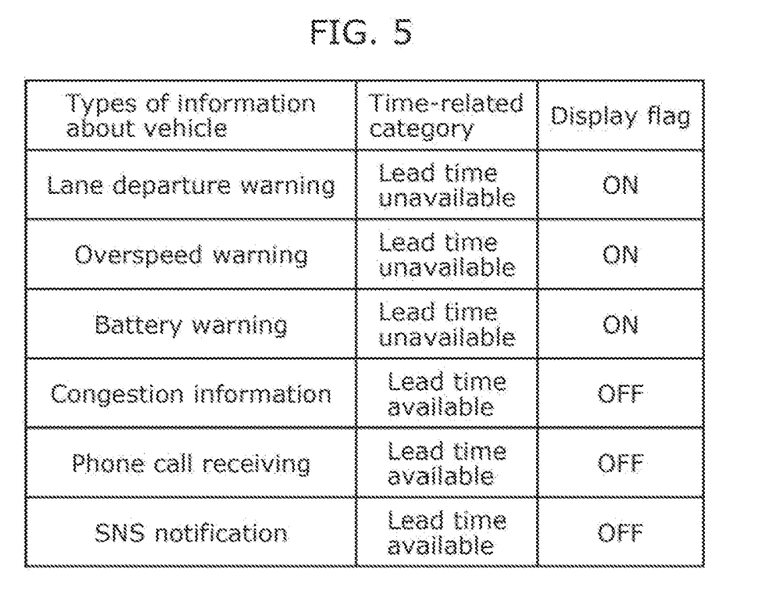
FIG. 5 is a diagram showing the relation between items of information about the vehicle and the display flags when a time-related category is selected among the categories of the first table.

When the time-related category is selected among the categories of the first table as shown in FIG. 5, for example, the display flag of information with sufficient lead time available is set to OFF. FIG. 5 is a diagram showing the relation between the items of information about vehicle 1 and the display flags when the time-related category is selected among the categories of the first table. Stated differently, the display flags of the congestion information, the phone call receiving, and the SNS notification are OFF because these items of information do not indicate urgent matters. In other words, display device 10 does not display a message unless information about vehicle 1 is obtained so as not to bother the user. For this reason, display 11 that is present in the eye-gaze direction of the user keeps displaying the originally displayed information about vehicle 1. Display device 10 then ends the processes shown in the flowchart in FIG. 4.

Meanwhile, when processing unit 17 determines that information about vehicle 1 has been obtained (Yes in S14), processing unit 17 determines whether the corresponding display flag is ON, on the basis of the first table (S15).

When processing unit 17 determines that such display flag is OFF on the basis of the first table (No in FIG. 15), processing unit 17 does not cause display 11 that is present in the eye-gaze direction of the user indicated by the eye-gaze information to newly display a message (S17).

When the time-related category is selected among the categories of the first table as shown in FIG. 5, for example, the display flag of information with sufficient lead time available is set to OFF. Stated differently, the display flags of the congestion information, the phone call receiving, and the SNS notification are OFF because these items of information do not indicate urgent matters.

Display device 10 then ends the processes shown in the flowchart in FIG. 4.

Meanwhile, when processing unit 17 determines that the display flag is ON, on the basis of the first table (YES in FIG. 15), processing unit 17 generates a message and causes display 11 that is present in the eye-gaze direction of the user indicated by the eye-gaze information to display the generated message (S16).

When the time-related category is selected among the categories of the first table as shown in FIG. 5, for example, the display flag of information with sufficient lead time unavailable is set to ON. Stated differently, the display flags of the lane departure warning, the overspeed warning, and the battery warning are ON because these items of information indicate urgent matters.

In particular, a message to be displayed on display 11 is a highly urgent message. Example cases where display 11 displays a message include: the temperature of cooling water is significantly higher than normal; the tire pressure exceeds the proper range; the remaining fuel amount is small; a predetermined problem prediction device detects the possibility of a problem; the surface of the road on which vehicle 1 is running is freezing; the speed of vehicle 1 is too high; and a congestion is occurring on a specified road.

Display device 10 then ends the processes shown in the flowchart in FIG. 4.

<Operational Advantages>

The following describes the operational advantages of display control device 10a, the display control method, and the recording medium in the present embodiment.

The conventional display device can be improved upon in the following point: a message is always displayed in the eye-gaze direction of a user regardless of the type of information about a vehicle every time information about the vehicle is generated, which bothers the user.

In view of this, display control device 10a according to the present embodiment, as described above, is display control device 10a that causes at least one of a plurality of displays 11 to display a message. Such display control device 10a includes: storage 16 that stores a first table for displaying the message; and processing unit 17 that determines, when information about vehicle 1 is generated and display 11 is present in an eye-gaze direction of the user that eye-gaze detector 13 detects, whether to cause display 11 to display the message, based on the first table and the eye-gaze direction detected, display 11 being one of the plurality of displays 11.

With this, it is possible not to cause display 11 that is present in the eye-gaze direction of the user to newly display a message when, for example, information about vehicle 1 that has been generated indicates a matter with a low degree of urgency. Meanwhile, it is also possible to cause display 11 to display a message when, for example, information about vehicle 1 indicates a matter with a high degree of urgency.

Thus, by appropriately displaying a message when the user focuses his/her eyes on display 11, display control device 10a is capable of preventing the user from being bothered.

Also, the display control method according to the present embodiment is a display control method of causing at least one of a plurality of displays 11 to display a message. Such display control method includes: determining, when information about vehicle 1 is generated and a display is present in an eye-gaze direction of the user detected, whether to cause display 11 to display the message, based on a first table for displaying the message and the eye-gaze direction detected, the display being one of the plurality of displays 11.

This display control method is also capable of achieving the same operational advantages as described above.

Also, the recording medium according to the present embodiment is a recording medium having recorded thereon a computer program for causing a computer to execute the display control method.

This recording medium is also capable of achieving the same operational advantages as described above.

In display control device 10a according to the present embodiment, when processing unit 17 determines to display the message based on the first table, processing unit 17 causes display 11 that is present in the eye-gaze direction of the user to display the message.

With this, by displaying a message for a matter with a high degree of urgency, for example, it is possible for the user to recognize the message displayed on display 11 that is present in the eye-gaze direction. This enables the user to take an action in accordance with the message, thus increasing the safety of vehicle 1 in operation.

In display control device 10a according to the present embodiment, when processing unit 17 determines not to display the message based on the first table, processing unit 17 does not cause display 11 that is present in the eye-gaze direction of the user to newly display the message.

With this, by not newly displaying a message for a matter with a low degree of urgency, for example, it is possible for the user to recognize only the information originally displayed on display 11 that is present in the eye-gaze direction. This thus prevents the user from being bothered.

In display control device 10a according to the present embodiment, the first table includes a plurality of categories, and when the plurality of categories are selected and processing unit 17 determines to display the message, processing unit 17 causes display 11 that is present in the eye-gaze direction of the user to display the message, based on at least one of the plurality categories selected.

With this, by selecting at least one category or combining at least two categories, for example, it is possible to determine whether to display a message on display 11 and then display the message when, for example, such message indicates a matter with a high degree of urgency. Stated differently, it is possible not to newly display a message for, for example, a matter with a low degree of urgency. With this, it is possible for display control device 10a to more appropriately display a message when the user focuses his/her eyes on display 11, thereby further preventing the user from being bothered.

In display control device 10a according to the present embodiment, the first table includes a category relating to time, the category indicating remaining time available for the user to address a matter indicated by the information about vehicle 1.

With this, it is possible to preliminarily determine that a message is to be displayed on display 11 for information that indicates a matter with a high degree of urgency among the items of information about vehicle 1. This enables a message to be more appropriately displayed when the user focuses his/her eyes on display 11.

In display control device 10a according to the present embodiment, the first table includes a category relating to a risk that is a human risk, a physical risk, or a temporal risk that occurs unless a matter indicated by the information about vehicle 1 is addressed.

With this, it is possible to preliminarily determine that a message is to be displayed on display 11 for information relating to a matter that causes a human risk, a physical risk, or a temporal risk among the items of information about vehicle 1. This enables a message to be more appropriately displayed when the user focuses his/her eyes on display 11.

In display control device 10a according to the present embodiment, the first table includes a category relating to optimization of vehicle 1, the category indicating adaptation of vehicle 1 to a driving situation in a matter indicated by the information about vehicle 1.

With this, it is possible to preliminarily determine that a message is to be displayed on display 11 for information relating to adaptation of vehicle 1 to the driving situation among the items of information about vehicle 1. This enables a message to be more appropriately displayed when the user focuses his/her eyes on display 11.

In display control device 10a according to the present embodiment, the first table includes a category relating to optimization for an individual, the category indicating adaptation to the user in a matter indicated by the information about vehicle 1.

With this, it is possible to preliminarily determine that a message is to be displayed on display 11 for information relating to adaptation to the user among the items of information about vehicle 1. This enables a message to be more appropriately displayed when the user focuses his/her eyes on display 11.

In display control device 10a according to the present embodiment, the first table includes a category relating to an action, the category indicating necessity for a passenger to address a matter indicated by the information about vehicle 1.

With this, it is possible to preliminarily determine that a message is to be displayed on display 11 for information relating to the necessity for a passenger to address a matter among the items of information about vehicle 1. This enables a message to be more appropriately displayed when the user focuses his/her eyes on display 11.

In display control device 10a according to the present embodiment, the first table includes a category relating to a display position, the category being used to determine whether the message is to be displayed together with originally displayed information.

With this, it is possible to preliminarily determine that a message is to be displayed on display 11 for information for determining whether to display a message together with the originally displayed information among the items of information about vehicle 1. This enables a message to be more appropriately displayed when the user focuses his/her eyes on display 11.

In display control device 10a according to the present embodiment, the first table includes a category relating to density of information display, the category being used to determine whether to display the message on one of the plurality of displays 11 that has a lowest resolution or on a smallest one of the plurality of displays 11.

With this, it is possible to preliminarily determine that a message is to be displayed on display 11 for information for determining whether to display a message on display 11 with low resolution and on small-sized display 11 among the items of information about vehicle 1. This enables a message to be more appropriately displayed when the user focuses his/her eyes on display 11.

Embodiment 2

The following describes display control device 10a, the display control method, and the recording medium according to the present embodiment.

Display control device 10a, the display control method, and the recording medium according to the present embodiment are different from those of Embodiment 1 in that a category can be selected on the basis of the running state of vehicle 1 and that a category can be selected on the basis of the running state of vehicle 1 and the road condition. The same reference marks are assigned to the same configuration and functions of display control device 10a, the display control method, and the recording medium according to the present embodiment as those of display control device 10a, the display control method, and the recording medium according to Embodiment 1 and detailed description thereof will be omitted.

<Configuration and Function>

First, the case will be described where a category is selected on the basis of the running state of vehicle 1.

In the present embodiment, sensor 14 is capable of obtaining the running state of vehicle 1 by detecting the surroundings of vehicle 1. The running state of vehicle 1 is, for example, that vehicle 1 is running (straight), turning right/left (running around a curve/intersection), stopped, and parked. Sensor 14 outputs the obtained running state of vehicle 1 to processing unit 17. Sensor 14 is an example of the obtainer.

Figure 6:
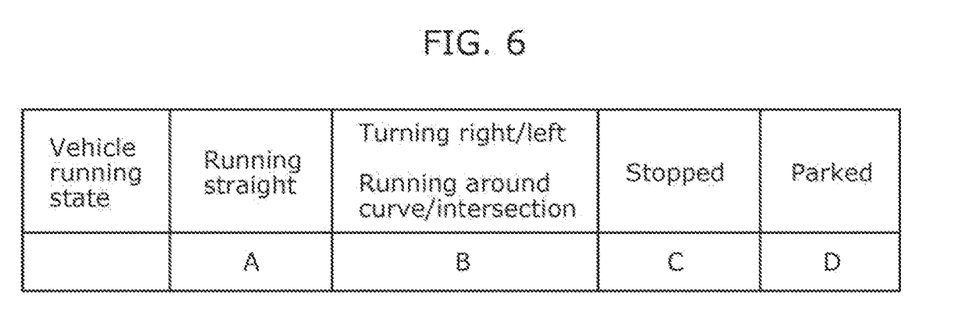
FIG. 6 is a diagram showing running states of the vehicle.

As shown in FIG. 6, storage 16 stores a second table that shows a plurality of categories associated with the running states of vehicle 1. FIG. 6 is a diagram showing the running states of vehicle 1.

Processing unit 17 may determine at least one of the plurality of categories on the basis of the second table.

In the present embodiment, a category may be automatically selected in accordance with a running state of vehicle 1.

More specifically, a category may be determined in accordance with a running state of vehicle 1 as shown in FIG. 6. In FIG. 6, the running states of vehicle 1 are categorized, for example, as: running (straight) A; turning right/left (running around a curve/intersection) B; stopped C; and parked D. Which category to select may be preliminarily determined in A through D.

When a plurality of categories are selected and the display flags of all of such selected categories are ON, processing unit 17 may cause display 11 to display a message. Also, when a plurality of categories are selected and the display flag of simply any one of these selected categories is ON, processing unit 17 may also cause display 11 to display a message.

Next, the case will be described where a category is selected on the basis of the running state of vehicle 1 and the road condition.

In the present embodiment, communicator 15 may be capable of obtaining the road condition from the car navigation system mounted in vehicle 1, a network, and so forth. Examples of the road condition include general road (one-way single lane), general road (a plurality of lanes), expressway (one-way single lane), and expressway (a plurality of lanes). Communicator 15 outputs the obtained road condition to processing unit 17. Communicator 15 is an example of the obtainer.

Figure 7:
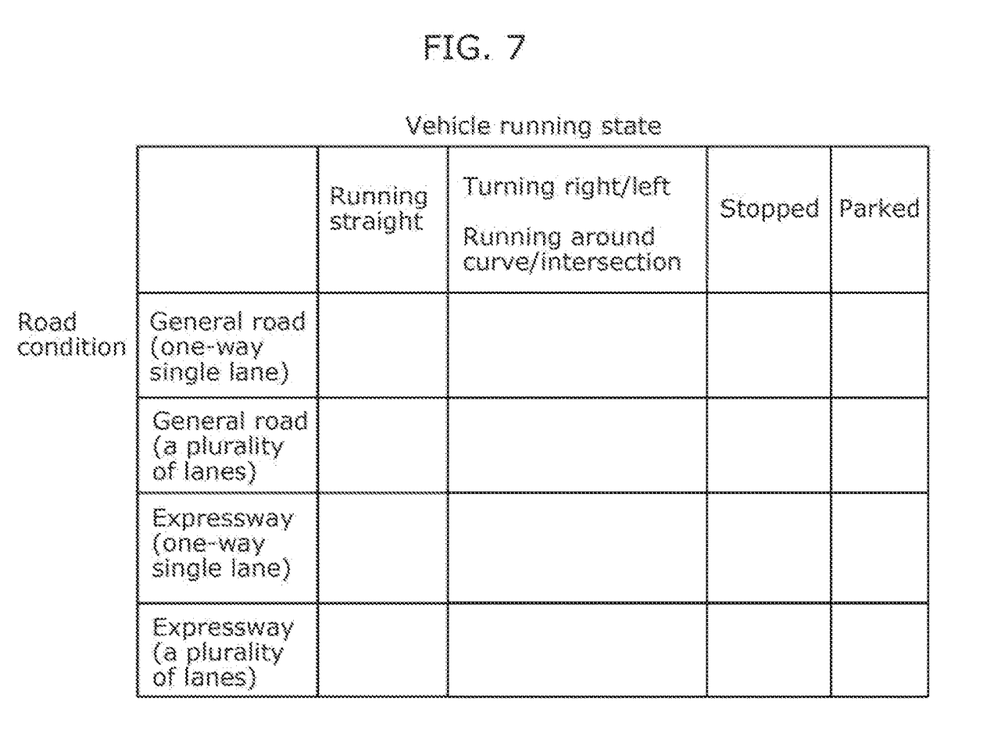
FIG. 7 is a diagram showing the relation between the running states of the vehicle and road conditions.

As shown in FIG. 7, storage 16 may store a third table that shows a plurality of categories associated with the relation between the running states of vehicle 1 and the road conditions. FIG. 7 is a diagram showing the relation between the running states of vehicle 1 and the road conditions.

Processing unit 17 may determine at least one of the plurality of categories on the basis of the third table.

In the present embodiment, a category may be automatically selected in accordance with a running state of vehicle 1 and a road condition.

More specifically, the selection of a category may be determined in accordance with a running state of vehicle 1 and a road condition as shown in FIG. 7. Examples of the road condition include general road (one-way single lane), general road (a plurality of lanes), expressway (one-way single lane), and expressway (a plurality of lanes). A table that shows 16 patterns of the relation between a running state of vehicle 1 and a road condition is preliminary prepared. Note that there may be greater than or equal to 16 patterns or less than 16 patterns depending on the settings of running states of vehicle 1 and road conditions.

In this case too, when a plurality of categories are selected and the display flags of all of such selected categories are ON, processing unit 17 may cause display 11 to display a message. Also, when a plurality of categories are selected and the display flag of simply any one of these selected categories is ON, processing unit 17 may also cause display 11 to display a message.

<Processing Operations>

The following describes processing operations performed by display control device 10a, the display control method, and the recording medium according to the present embodiment.

[Example Operations]

Figure 8:
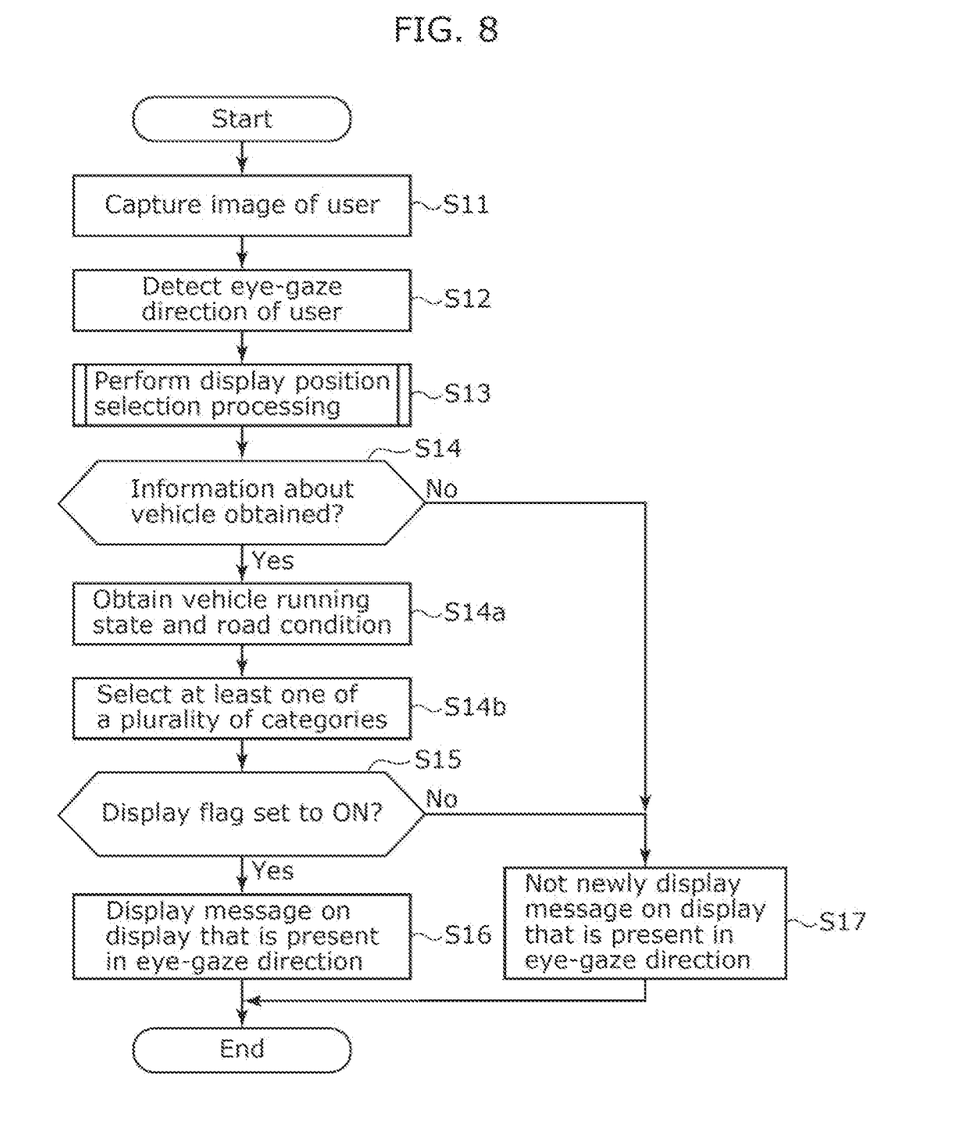
FIG. 8 is a flowchart of processing operations performed by a display device according to Embodiment 2.

FIG. 8 is a flowchart of processing operations performed by display device 10 according to Embodiment 2. The description of the same example operations as those shown in FIG. 4 will be omitted as appropriate. In FIG. 8, the case is illustrated where a category is selected on the basis of a running state of vehicle 1 and a road condition.

First, as shown in FIG. 8, when processing unit 17 determines that information about vehicle 1 has been obtained after going through the processes of step S11 through step S14 (YES in S14), processing unit 17 obtains the current running state of vehicle 1 and the current road condition from sensor 14 and/or communicator 15 (S14a).

Next, processing unit 17 selects at least one of the categories on the basis of the current running state of vehicle 1 and the current road condition (S14b). For example, processing unit 17 selects at least one of the categories form the relation between the running states of vehicle 1 and the road conditions shown in the third table of FIG. 7.

Next, processing unit 17 determines whether the display flag is ON, on the basis of the first table that shows the relation between the at least one category selected in step S14b and the information about vehicle 1 (S15).

Subsequently, display device 10 ends the processes of the flowchart shown in FIG. 8 after the processes of steps S15 and S16 or the processes of steps S15 through S17.

Note that when a category is selected on the basis of a running state of vehicle 1, processing unit 17 may obtain the current running state of vehicle 1 from sensor 14 in step S14a in FIG. 8. Also, in step S14b in FIG. 8, processing unit 17 may use the second table to select at least one of the categories on the basis of the current running state of vehicle 1.

<Operational Advantages>

The following describes the operational advantages of display control device 10a, the display control method, and the recording medium in the present embodiment.

As described above, display control device 10a according to the present embodiment includes an obtainer (sensor 14) that obtains a running state of vehicle 1. Storage 16 stores a second table that shows a plurality of categories associated with running states of vehicle 1. Processing unit 17 determines at least one of the plurality of categories on the basis of the second table.

With this, it is possible to determine at least one category in accordance with the running state of vehicle 1 on the basis of the second table. This saves the trouble of the user having to select a category, thus increasing the convenience of the user in vehicle 1.

Also, in display control device 10a according to the present embodiment, the obtainer (sensor 14 and communicator 15) further obtains a road condition. Storage 16 stores a third table that shows a plurality of categories associated with running states of vehicle 1 and road conditions. Processing unit 17 determines at least one of the plurality of categories on the basis of the third table.

With this, it is possible to determine at least one category in accordance with the running state of vehicle 1 and the road condition on the basis of the third table. Stated differently, processing unit 17 is capable of determining at least one category that is more optimum. This also saves the trouble of the user having to select a category, thus increasing the convenience of the user in vehicle 1.

Other Variations

The display control device, the display control method, and the recording medium according to the present disclosure have been described above on the basis of Embodiments 1 and 2, but the present disclosure is not limited to Embodiments 1 and 2. The scope of the present disclosure may also include variations achieved by making various modifications to Embodiments 1 and 2 that can be conceived by those skilled in the art without departing from the spirit of the present disclosure.

Figure 9:
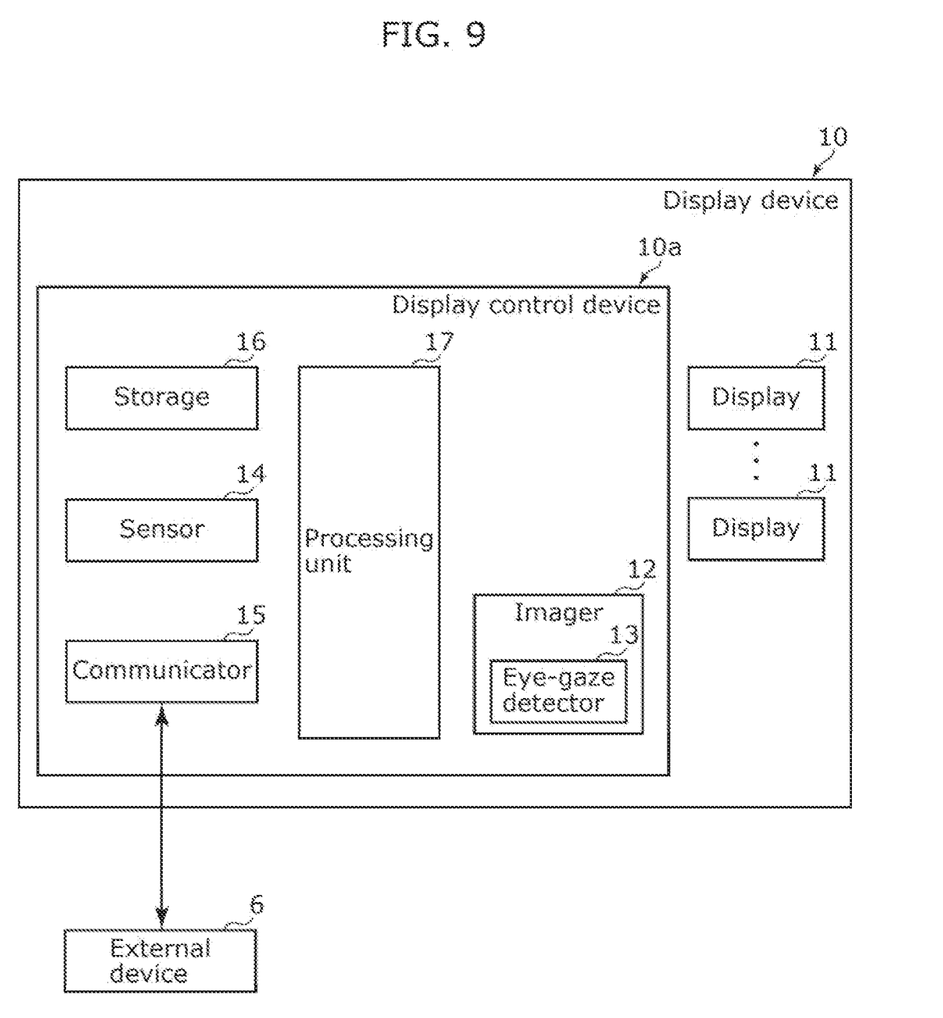
FIG. 9 is a block diagram showing a display device that includes a display control device according to a variation of Embodiments 1 and 2.

Example variations of display control device 10a, the display control method, and the recording medium according to Embodiments 1 and 2 will be described with reference to FIG. 9. FIG. 9 is a block diagram showing a display device that includes a display control device according to a variation of the embodiments. For example, communicator 15 of display control device 10a may obtain a message from external device 6 when information about vehicle 1 is generated. When any one of displays 11 is present in the eye-gaze direction of the user, processing unit 17 may determine whether to cause such display 11 to display the foregoing message obtained by communicator 15 from external device 6, on the basis of the first table and the eye-gaze direction detected by eye-gaze detector 13. In this case too, it is possible not to cause display 11 that is present in the eye-gaze direction of the user to newly display a message when, for example, information about vehicle 1 that has been generated indicates a matter with a low degree of urgency. Meanwhile, when information about vehicle 1 indicates a matter with a high degree of urgency, it is also possible to cause display 11 to display a message.

Also, in display control device 10a, the display control method, and the recording medium according to Embodiments 1 and 2 described above, the processing unit may generate a message on the basis of the first table, regardless of whether a display flag is ON or OFF. When processing unit 17 determines that a display flag indicating that a message based on the first table is to be displayed is ON, processing unit 17 may associate the message with information indicating that the display flag is ON by adding such information to the message, and output the message and the information indicating that the display flag is ON onto the display that is present in the direction of the point gazed at by the user. Also, when processing unit 17 determines that a display flag indicating that a message based on the first table is not to be displayed is OFF, processing unit 17 may associate the message with information indicating that the display flag is OFF by adding such information to the message, and output the message and the information indicating that the display flag is OFF onto the display that is present in the direction of the point gazed at by the user. In this case, when obtaining the message and the information indicating that the display flag is ON, the display is able to determine whether to display the message on the basis of the information indicating that the display flag is ON. Meanwhile, when obtaining the message and the information indicating that the display flag is OFF, the display is able to determine whether not to display the message on the basis of the information indicating that the display flag is OFF.

Note that the processing unit, the eye-gaze detector, and others which are elements included in the display control device according to Embodiments 1 and 2 described above are implemented as a large-scale integration (LSI), which is typically an integrated circuit. These may take the form of individual chips, or may be partially or wholly encapsulated into single chips.

Also, a technique of circuit integration is not limited to the implementation as an LSI. Each of the elements thus may be implemented as a dedicated circuit or a general-purpose processor. A field programmable gate array (FPGA) that allows for programming after the manufacture of an LSI, or a reconfigurable processor that allows for reconfiguration of the connection and the settings of circuit cells inside an LSI may be employed.

Each of the elements in Embodiments 1 and 2 may be configured in the form of an exclusive hardware product, or may be realized by executing a software program suitable for the element. Each of the elements may be realized by means of a program executing unit, such as a CPU and a processor, reading and executing the software program recorded on a recording medium such as a hard disk or a semiconductor memory.

The numerics used in the above description are all examples to specifically describe the present disclosure, and thus the present disclosure is not limited to such example numerics used in Embodiments 1 and 2.

Also, the division of the functional blocks in the block diagrams is an example, and thus a plurality of functional blocks may be implemented as a single functional block, a single functional block may be divided into a plurality of blocks, or one or more functions may be moved to another functional block. Also, the functions of a plurality of functional blocks having similar functions may be processed by single hardware or software in parallel or in a time-shared manner.

Also, the order of performing each of the steps in the flowcharts is an example to specifically describe the present disclosure, and thus other order may be used. One or more of the steps may be performed simultaneously (in parallel) with another step.

The scope of the present disclosure also includes an embodiment achieved by making various modifications to Embodiments 1 and 2 that can be conceived by those skilled in the art without departing from the essence of the present disclosure and another embodiment achieved by freely combining some of the elements and functions of Embodiments 1 and 2.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings, and claims are incorporated herein by reference in their entirety: Japanese Patent Application No. 2021-210005 filed on Dec. 23, 2021 and Japanese Patent Application No. 2022-195855 filed on Dec. 7, 2022.

INDUSTRIAL APPLICABILITY

The present disclosure is applicable for use, for example, in a vehicle that includes a plurality of display control devices, and in a device and a system other than vehicles.

The invention claimed is:

1. A display control device that causes at least one of a plurality of displays to display a message, the display control device comprising:
   a memory that stores a first table for displaying the message; and
   a processor that determines, when information about a vehicle is generated and a display is present in an eye-gaze direction of a user that is detected by a processor, whether to cause the display to display the message, based on the first table and the eye-gaze direction detected, the display being one of the plurality of displays,
   wherein the processor:
      when the processor determines that a display flag indicating that the message based on the first table is to be displayed is ON, outputs the message and information indicating that the display flag is ON to the display that is present in the eye-gaze direction of the user; and
      when the processor determines that the display flag indicating that the message based on the first table is to be displayed is OFF, outputs the message and information indicating that the display flag is OFF to the display that is present in the eye-gaze direction of the user.

2. The display control device according to claim 1, wherein the first table includes a first plurality of categories corresponding to the information about the vehicle and a second plurality of categories corresponding to the information about the vehicle, with the first plurality of categories being different from the second plurality of categories, and with each of the first plurality of categories including at least one correspondence with each of the second plurality of categories, and the processor further determines, based on the information about the vehicle, whether to cause the display to display the message based on a correspondence between one of the first plurality of categories and one of the second plurality of categories.

3. The display control device according to claim 1, wherein when the processor determines, based on the display flag, to display the message based on the first table, the processor causes the display that is present in the eye-gaze direction of the user to display the message.

4. The display control device according to claim 1, wherein when the processor determines, based on the display flag, not to display the message based on the first table, the processor does not cause the display that is present in the eye-gaze direction of the user to newly display the message.

5. The display control device according to claim 1, wherein the first table includes a first plurality of categories corresponding to the information about the vehicle and a second plurality of categories corresponding to the information about the vehicle, with the first plurality of categories being different from the second plurality of categories, and with each of the first plurality of categories including at least one correspondence with each of the second plurality of categories, and when the processor determines, based on the display flag, to display the message based on the first table, the processor causes the display that is present in the eye-gaze direction of the user to display the message, based on a correspondence between one of the first plurality categories and one of the second plurality of categories.

6. The display control device according to claim 5, wherein the second plurality of categories includes a category relating to time, the category indicating remaining time available for the user to address a matter indicated by the information about the vehicle.

7. The display control device according to claim 5, wherein the second plurality of categories includes a category relating to a risk that is a human risk, a physical risk, or a temporal risk that occurs unless a matter indicated by the information about the vehicle is addressed.

8. The display control device according to claim 5, wherein the second plurality of categories includes a category relating to optimization of the vehicle, the category indicating adaptation of the vehicle to a driving situation in a matter indicated by the information about the vehicle.

9. The display control device according to claim 5, wherein the second plurality of categories includes a category relating to optimization for an individual, the category indicating adaptation to the user in a matter indicated by the information about the vehicle.

10. The display control device according to claim 5, wherein the second plurality of categories includes a category relating to an action, the category indicating necessity for a passenger to address a matter indicated by the information about the vehicle.

11. The display control device according to claim 5, wherein the second plurality of categories includes a category relating to a display position, the category being used to determine whether the message is to be displayed together with originally displayed information.

12. The display control device according to claim 5, wherein the second plurality of categories includes a category relating to density of information display, the category being used to determine whether to display the message on one of the plurality of displays that has a lowest resolution or on a smallest one of the plurality of displays.

13. The display control device according to claim 5, wherein the processor obtains a running state of the vehicle, the memory stores a second table that shows a plurality of third categories associated with the running state of the vehicle, and the processor determines at least one of the second plurality of categories based on the second table.

14. The display control device according to claim 13, wherein the processor further obtains a road condition, the memory stores a third table that shows a fourth plurality of categories associated with a relation between the running state of the vehicle and the road condition, and the processor determines at least one of the second plurality of categories based on the third table.

15. The display control device according to claim 1, wherein the display control device obtains the message from an external device when the information about the vehicle is generated, and the processor further determines, when the display is present in the eye-gaze direction of the user, whether to cause the display to display the message that is obtained by the display control device from the external device, based on the first table and the eye-gaze direction detected, the display being one of the plurality of displays.

16. The display control device according to claim 1, wherein, in the first table, each of the first plurality of categories includes a plurality of sub-categories, with each of the plurality of sub-categories including at least one correspondence with each of the second plurality of categories.

17. The display control device according to claim 16, wherein, in the first table, at least one of the plurality of sub-categories within one of the first plurality of categories includes a plurality of further sub-categories, with each of the plurality of further sub-categories including one correspondence with each of the second plurality of categories.

18. The display control device according to claim 17, wherein one of the plurality of sub-categories for one of the first plurality of categories includes warning lights, with the plurality of further sub-categories for the one of the plurality of sub-categories including a battery warning, an engine warning, and a tire pressure warning.

19. A display control method of causing at least one of a plurality of displays to display a message, the display control method comprising:

storing, in a memory, a first table for displaying the message; and determining, by a processor, when information about a vehicle is generated and a display is present in an eye-gaze direction of a user, whether to cause the display to display the message, based on the first table for displaying the message and the eye-gaze direction, the display being one of the plurality of displays, wherein the processor:
- when the processor determines that a display flag indicating that the message based on the first table is to be displayed is ON, outputs the message and information indicating that the display flag is ON to the display that is present in the eye-gaze direction of the user; and
- when the processor determines that the display flag indicating that the message based on the first table is to be displayed is OFF, outputs the message and information indicating that the display flag is OFF to the display that is present in the eye-gaze direction of the user.

20. A non-transitory computer-readable recording medium including a computer program, the computer program, when executed by a computer, causing the computer to execute a display control method, the display control method comprising:

storing, in a memory, a first table for displaying the message; and determining, by the computer, when information about a vehicle is generated and a display is present in an eye-gaze direction of a user, whether to cause the display to display the message, based on the first table for displaying the message and the eye-gaze direction, the display being one of the plurality of displays, wherein the computer:
- when the computer determines that a display flag indicating that the message based on the first table is to be displayed is ON, outputs the message and information indicating that the display flag is ON to the display that is present in the eye-gaze direction of the user; and
- when the computer determines that the display flag indicating that the message based on the first table is to be displayed is OFF, outputs the message and information indicating that the display flag is OFF to the display that is present in the eye-gaze direction of the user.

* * * * *